US012591687B2

(12) United States Patent
Kilgallon et al.

(10) Patent No.: US 12,591,687 B2
(45) Date of Patent: Mar. 31, 2026

(54) METHOD AND SYSTEM FOR FACILITATING APPLICATION VULNERABILITY DRIFT ANALYTICS

(71) Applicant: JPMorgan Chase Bank, N.A., New York, NY (US)

(72) Inventors: Sean Kilgallon, Newark, DE (US); Shazia Khan, Downingtown, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 208 days.

(21) Appl. No.: 18/142,698

(22) Filed: May 3, 2023

(65) Prior Publication Data

US 2023/0359745 A1 Nov. 9, 2023

Related U.S. Application Data

(60) Provisional application No. 63/364,152, filed on May 4, 2022.

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC ........................ G06F 21/577; G06F 2221/033
See application file for complete search history.

(56) References Cited

U.S. PATENT DOCUMENTS

| | | | | |
|---|---|---|---|---|
| 9,246,935 B2 * | 1/2016 | Lietz | ....................... | H04L 67/34 |
| 11,516,222 B1 * | 11/2022 | Srinivasan | ............ | G06F 21/577 |
| 2015/0047046 A1 * | 2/2015 | Pavlyushchik | ..... | H04L 63/1433 |
| | | | | 726/25 |
| 2019/0251267 A1 * | 8/2019 | Wysopal | ............ | G06F 11/3612 |
| 2019/0362078 A1 * | 11/2019 | Inagaki | ............... | H04L 63/1433 |
| 2021/0342450 A1 * | 11/2021 | Patel | ..................... | G06F 21/577 |
| 2022/0027477 A1 * | 1/2022 | Hercock | ................ | G06N 3/044 |
| 2022/0156383 A1 * | 5/2022 | Schwarzbauer | ........ | G06F 21/54 |
| 2022/0222351 A1 * | 7/2022 | Levin | .................... | G06F 21/577 |
| 2023/0064373 A1 * | 3/2023 | Starr | ..................... | G06F 21/577 |
| 2023/0283521 A1 * | 9/2023 | Berger | .................... | H04L 63/20 |
| | | | | 709/223 |
| 2023/0351026 A1 * | 11/2023 | Cross | ..................... | G06F 9/455 |

* cited by examiner

*Primary Examiner* — Rupal Dharia
*Assistant Examiner* — Raghavender Nmn Cholleti
(74) *Attorney, Agent, or Firm* — GREENBLUM & BERNSTEIN, P.L.C.

(57) ABSTRACT

A method for providing vulnerability management by using drift analytics is disclosed. The method includes aggregating vulnerability reports that correspond to an application based on a predetermined configuration, the predetermined configuration including a predetermined schedule; appending the vulnerability reports to a historical record that corresponds to the application, the historical record including previously collected vulnerability reports; determining metrics for the application by using the corresponding historical record; generating a drift summary for the application based on the determined metrics and the corresponding historical record; comparing the drift summary with a previously generated drift summary to identify changes, the changes relating to a vulnerability status; and generating a drift report for the application based on the identified changes.

20 Claims, 5 Drawing Sheets

100

102

| Processor 104 Instructions | Memory 106 Instructions | Display 108 | Input Device(s) 110 | Medium Reader 112 Instructions | Network Interface 114 | Output Device(s) 116 |

Bus 118

Network 122

120

400

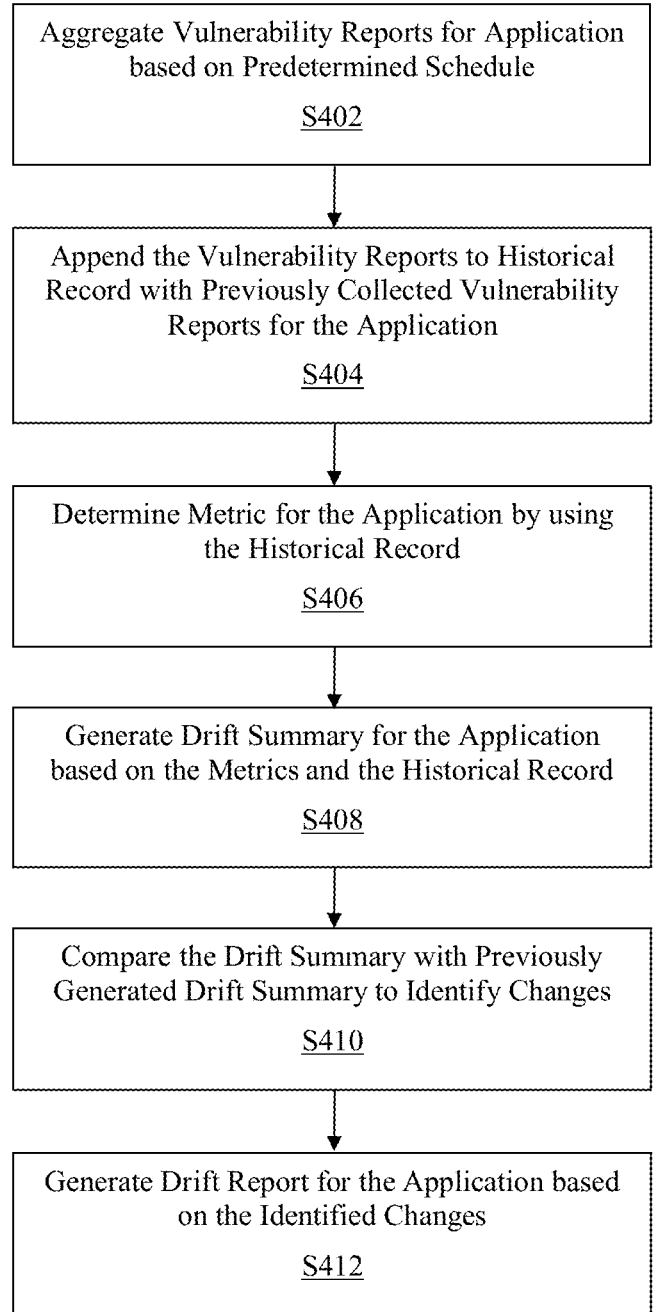

Aggregate Vulnerability Reports for Application based on Predetermined Schedule

S402

Append the Vulnerability Reports to Historical Record with Previously Collected Vulnerability Reports for the Application

S404

Determine Metric for the Application by using the Historical Record

S406

Generate Drift Summary for the Application based on the Metrics and the Historical Record

S408

Compare the Drift Summary with Previously Generated Drift Summary to Identify Changes

S410

Generate Drift Report for the Application based on the Identified Changes

METHOD AND SYSTEM FOR FACILITATING APPLICATION VULNERABILITY DRIFT ANALYTICS

CROSS-REFERENCE TO RELATED APPLICATIONS

This application claims the benefit of U.S. Provisional Patent Application Ser. No. 63/364,152, filed May 4, 2022, which is hereby incorporated by reference in its entirety.

BACKGROUND

1. Field of the Disclosure

This technology generally relates to methods and systems for vulnerability management, and more particularly to methods and systems for managing software programming vulnerabilities by using vulnerability drift analytics to prioritize, track, and visually represent identified vulnerabilities.

2. Background Information

Many business entities operate vast software ecosystems to facilitate business operations and provide services for users. Often, these vast software ecosystems include numerous individual software programs that must be maintained to ensure that identified vulnerabilities do not comprise safety and security. Historically, implementations of conventional vulnerability management techniques have resulted in varying degrees of success with respect to prioritizing and tracking necessary remediation actions.

One drawback of using the conventional vulnerability management techniques is that in many instances, vulnerabilities are identified and scored by scanning solutions for implementation of remediation actions by a user such as, for example, a software developer. As a result, it is up to the user to maintain best practices and address the identified vulnerabilities. Additionally, the responsibility is also on the user to understand the technical debt that is associated with vulnerabilities that have accumulated over time.

Therefore, there is a need for a vulnerability management solution that utilizes vulnerability drift analytics to prioritize, track, and visually represent identified vulnerabilities to facilitate understanding of accumulated vulnerabilities over time.

SUMMARY

The present disclosure, through one or more of its various aspects, embodiments, and/or specific features or sub-components, provides, inter alia, various systems, servers, devices, methods, media, programs, and platforms for managing software programming vulnerabilities by using vulnerability drift analytics to prioritize, track, and visually represent identified vulnerabilities.

According to an aspect of the present disclosure, a method for providing vulnerability management by using drift analytics is disclosed. The method is implemented by at least one processor. The method may include aggregating at least one vulnerability report that corresponds to at least one application based on a predetermined configuration, the predetermined configuration may include a predetermined schedule; appending the at least one vulnerability report to a historical record that corresponds to the at least one application, the historical record may include a plurality of previously collected vulnerability reports; determining at least one metric for each of the at least one application by using the corresponding historical record; generating at least one drift summary for the at least one application based on the determined at least one metric and the corresponding historical record; comparing the at least one drift summary with at least one previously generated drift summary to identify at least one change, the at least one change may relate to a vulnerability status; and generating at least one drift report for the at least one application based on the identified at least one change.

In accordance with an exemplary embodiment, the method may further include generating at least one graphical representation of the generated at least one drift report, the at least one graphical representation may include at least one from among a pictorial representation and a diagram that organizes information in the generated at least one drift report; and displaying the at least one graphical representation via an interactive web application.

In accordance with an exemplary embodiment, the at least one graphical representation may include at least one interactive graphical element that is configured to receive input from a user, the input may include at least one instruction to alter the at least one graphical representation based on a user preference.

In accordance with an exemplary embodiment, each of the at least one vulnerability report may include information that relates to at least one from among a software bill of materials for all dependencies, an open-source license for each of a plurality of software components, and a list of security vulnerabilities that shows a severity level for each of the plurality of software components.

In accordance with an exemplary embodiment, to determine the at least one metric, the method may further include parsing the aggregated at least one vulnerability report to identify vulnerability information; and determining, from the identified vulnerability information, at least one vulnerability that corresponds to the at least one application by using an application identifier.

In accordance with an exemplary embodiment, the method may further include determining a score metric for each of the at least one vulnerability; determining a vulnerability count metric that relates to a total number of the at least one vulnerability; determining an age metric for each of the at least one vulnerability; and determining a vulnerability likelihood and severity metric for each of the at least one vulnerability.

In accordance with an exemplary embodiment, the score metric may correspond to a mean score value that represents a principal characteristic of each of the at least one vulnerability, the mean score value may include a severity factor.

In accordance with an exemplary embodiment, the age metric may correspond to an amount of time between a first found time and a report time that is associated with the at least one vulnerability report, the first found time may relate to a time value when each of the at least one vulnerability is first discovered.

In accordance with an exemplary embodiment, the vulnerability likelihood and severity metric may correspond to a severity rating that is associated with a past due status for each of the at least one vulnerability, the past due status may result from a determination that uses a service level agreement, a first found time, a calculated due date, and a determined point in time.

According to an aspect of the present disclosure, a computing device configured to implement an execution of a method for providing vulnerability management by using drift analytics is disclosed. The computing device including a processor; a memory; and a communication interface coupled to each of the processor and the memory, wherein the processor may be configured to aggregate at least one vulnerability report that corresponds to at least one application based on a predetermined configuration, the predetermined configuration may include a predetermined schedule; append the at least one vulnerability report to a historical record that corresponds to the at least one application, the historical record may include a plurality of previously collected vulnerability reports; determine at least one metric for each of the at least one application by using the corresponding historical record; generate at least one drift summary for the at least one application based on the determined at least one metric and the corresponding historical record; compare the at least one drift summary with at least one previously generated drift summary to identify at least one change, the at least one change may relate to a vulnerability status; and generate at least one drift report for the at least one application based on the identified at least one change.

In accordance with an exemplary embodiment, the processor may be further configured to generate at least one graphical representation of the generated at least one drift report, the at least one graphical representation may include at least one from among a pictorial representation and a diagram that organizes information in the generated at least one drift report; and display the at least one graphical representation via an interactive web application.

In accordance with an exemplary embodiment, the at least one graphical representation may include at least one interactive graphical element that is configured to receive input from a user, the input may include at least one instruction to alter the at least one graphical representation based on a user preference.

In accordance with an exemplary embodiment, each of the at least one vulnerability report may include information that relates to at least one from among a software bill of materials for all dependencies, an open-source license for each of a plurality of software components, and a list of security vulnerabilities that shows a severity level for each of the plurality of software components.

In accordance with an exemplary embodiment, to determine the at least one metric, the processor may be further configured to parse the aggregated at least one vulnerability report to identify vulnerability information; and determine, from the identified vulnerability information, at least one vulnerability that corresponds to the at least one application by using an application identifier.

In accordance with an exemplary embodiment, the processor may be further configured to determine a score metric for each of the at least one vulnerability; determine a vulnerability count metric that relates to a total number of the at least one vulnerability; determine an age metric for each of the at least one vulnerability; and determine a vulnerability likelihood and severity metric for each of the at least one vulnerability.

In accordance with an exemplary embodiment, the score metric may correspond to a mean score value that represents a principal characteristic of each of the at least one vulnerability, the mean score value may include a severity factor.

In accordance with an exemplary embodiment, the age metric may correspond to an amount of time between a first found time and a report time that is associated with the at least one vulnerability report, the first found time may relate to a time value when each of the at least one vulnerability is first discovered.

In accordance with an exemplary embodiment, the vulnerability likelihood and severity metric may correspond to a severity rating that is associated with a past due status for each of the at least one vulnerability, the past due status may result from a determination that uses a service level agreement, a first found time, a calculated due date, and a determined point in time.

According to an aspect of the present disclosure, a non-transitory computer readable storage medium storing instructions for providing vulnerability management by using drift analytics is disclosed. The storage medium including executable code which, when executed by a processor, may cause the processor to aggregate at least one vulnerability report that corresponds to at least one application based on a predetermined configuration, the predetermined configuration may include a predetermined schedule; append the at least one vulnerability report to a historical record that corresponds to the at least one application, the historical record may include a plurality of previously collected vulnerability reports; determine at least one metric for each of the at least one application by using the corresponding historical record; generate at least one drift summary for the at least one application based on the determined at least one metric and the corresponding historical record; compare the at least one drift summary with at least one previously generated drift summary to identify at least one change, the at least one change may relate to a vulnerability status; and generate at least one drift report for the at least one application based on the identified at least one change.

In accordance with an exemplary embodiment, when executed by the processor, the executable code may further cause the processor to generate at least one graphical representation of the generated at least one drift report, the at least one graphical representation may include at least one from among a pictorial representation and a diagram that organizes information in the generated at least one drift report; and display the at least one graphical representation via an interactive web application.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for implementing a method for managing software programming vulnerabilities by using vulnerability drift analytics to prioritize, track, and visually represent identified vulnerabilities.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
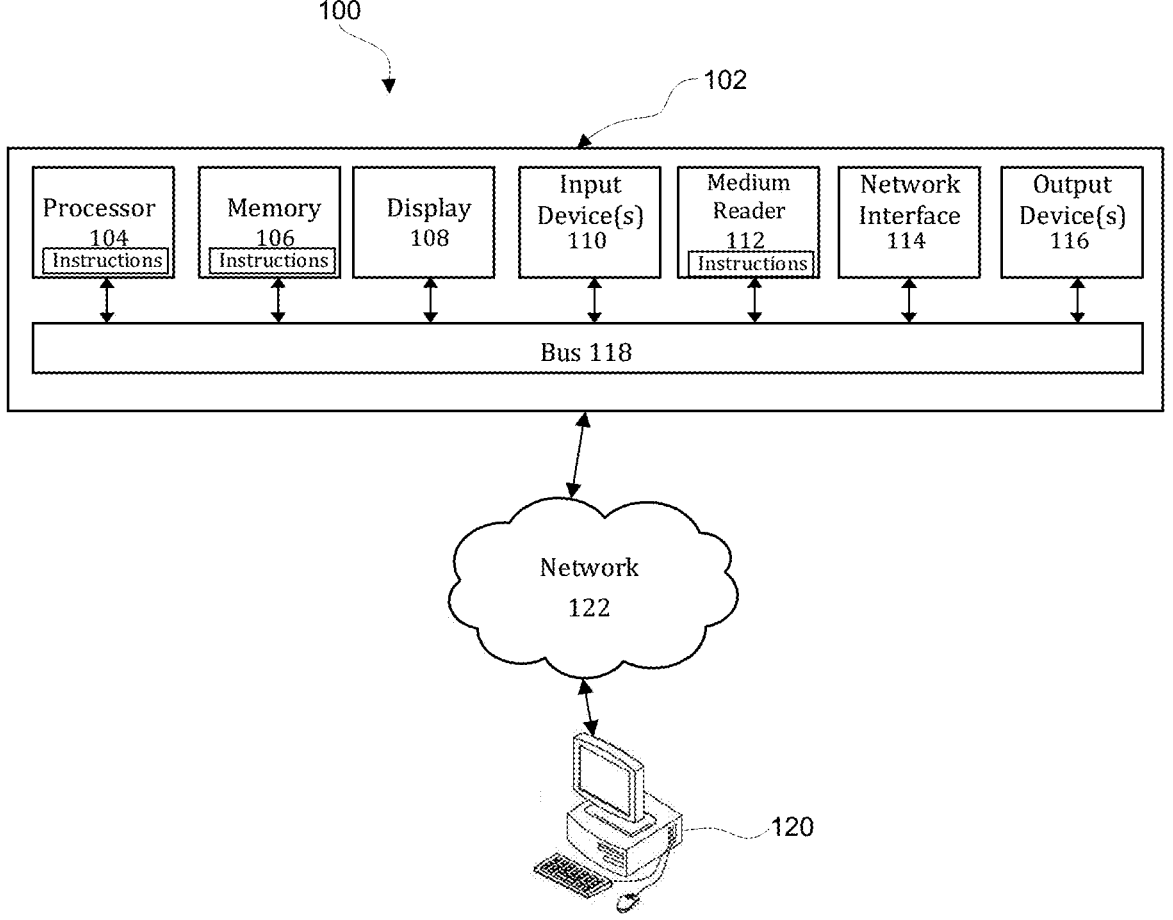
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for managing software programming vulnerabilities by using vulnerability drift analytics to prioritize, track, and visually represent identified vulnerabilities.

Figure 2:
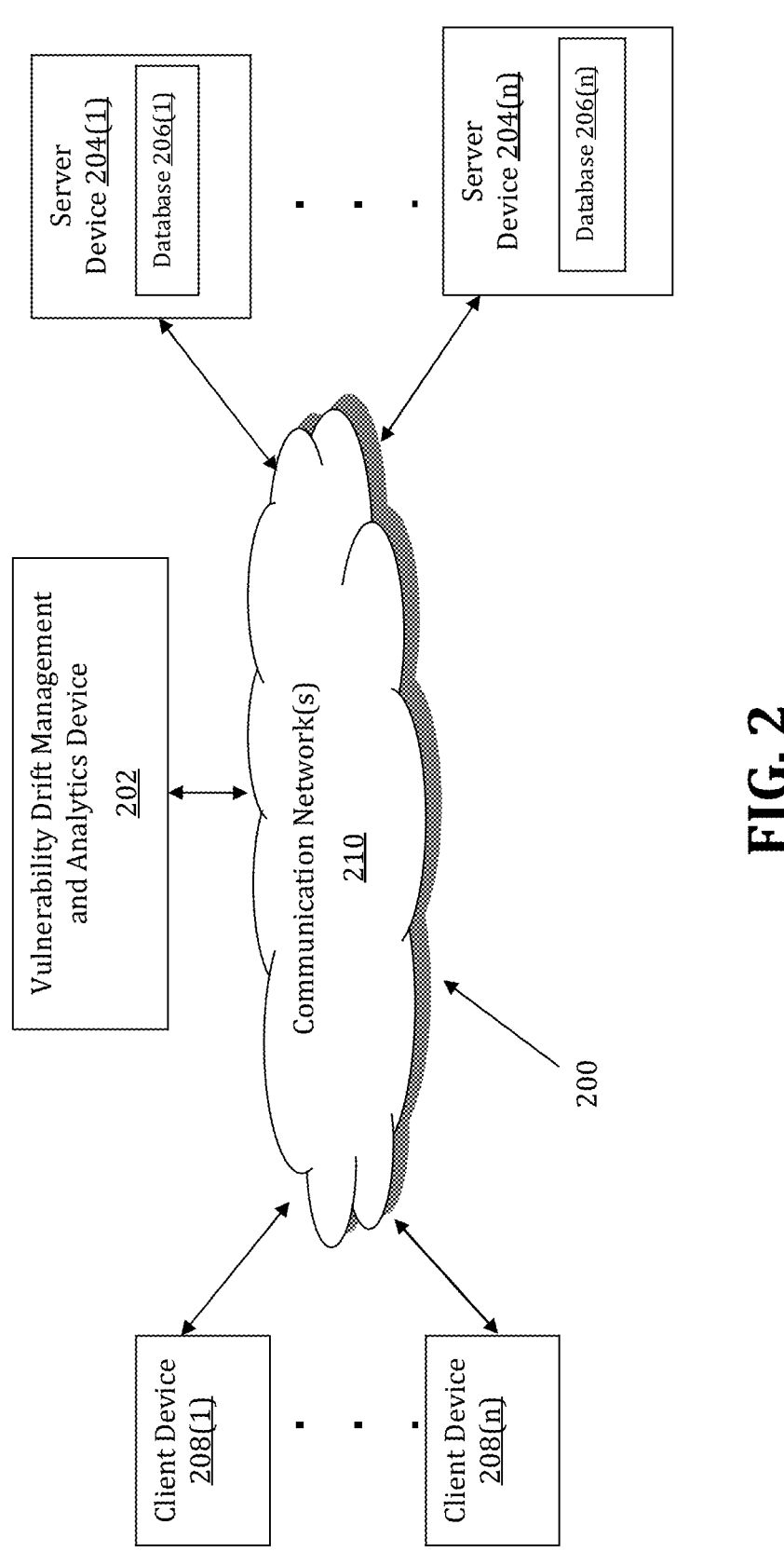
FIG. 2 illustrates an exemplary diagram of a network environment.

Referring to FIG. 2, a schematic of an exemplary network environment 200 for implementing a method for managing software programming vulnerabilities by using vulnerability drift analytics to prioritize, track, and visually represent identified vulnerabilities is illustrated. In an exemplary embodiment, the method is executable on any networked computer platform, such as, for example, a personal computer (PC).

The method for managing software programming vulnerabilities by using vulnerability drift analytics to prioritize, track, and visually represent identified vulnerabilities may be implemented by a Vulnerability Drift Management and Analytics (VDMA) device 202. The VDMA device 202 may be the same or similar to the computer system 102 as described with respect to FIG. 1. The VDMA device 202 may store one or more applications that can include executable instructions that, when executed by the VDMA device 202, cause the VDMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the VDMA device 202 itself, may be located in virtual server(s) running in a cloud-based computing environment rather than being tied to one or more specific physical network computing devices. Also, the application(s) may be running in one or more virtual machines (VMs) executing on the VDMA device 202. Additionally, in one or more embodiments of this technology, virtual machine(s) running on the VDMA device 202 may be managed or supervised by a hypervisor.

In the network environment 200 of FIG. 2, the VDMA device 202 is coupled to a plurality of server devices 204(1)-204(n) that hosts a plurality of databases 206(1)-206(n), and also to a plurality of client devices 208(1)-208(n) via communication network(s) 210. A communication interface of the VDMA device 202, such as the network interface 114 of the computer system 102 of FIG. 1, operatively couples and communicates between the VDMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the VDMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and VDMA devices that efficiently implement a method for managing software programming vulnerabilities by using vulnerability drift analytics to prioritize, track, and visually represent identified vulnerabilities.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The VDMA device 202 may be a standalone device or integrated with one or more other devices or apparatuses, such as one or more of the server devices 204(1)-204(n), for example. In one particular example, the VDMA device 202 may include or be hosted by one of the server devices 204(1)-204(n), and other arrangements are also possible. Moreover, one or more of the devices of the VDMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the VDMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to vulnerability reports, applications, predetermined configurations, predetermined schedules, historical records, score metrics, vulnerability count metrics, age metrics, vulnerability likelihood and severity metrics, drift summaries, changes, vulnerability statuses, and drift reports.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the VDMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the VDMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the VDMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the VDMA device 202, the server devices 204(1)-204(n), or the client devices 208(1)-208(n), for example, may be configured to operate as virtual instances on the same physical machine. In other words, one or more of the VDMA device 202, the server devices 204(1)-204(n), or the client devices 208(1)-208(n) may operate on the same physical device rather than as separate devices communicating through communication network(s) 210. Additionally, there may be more or fewer VDMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
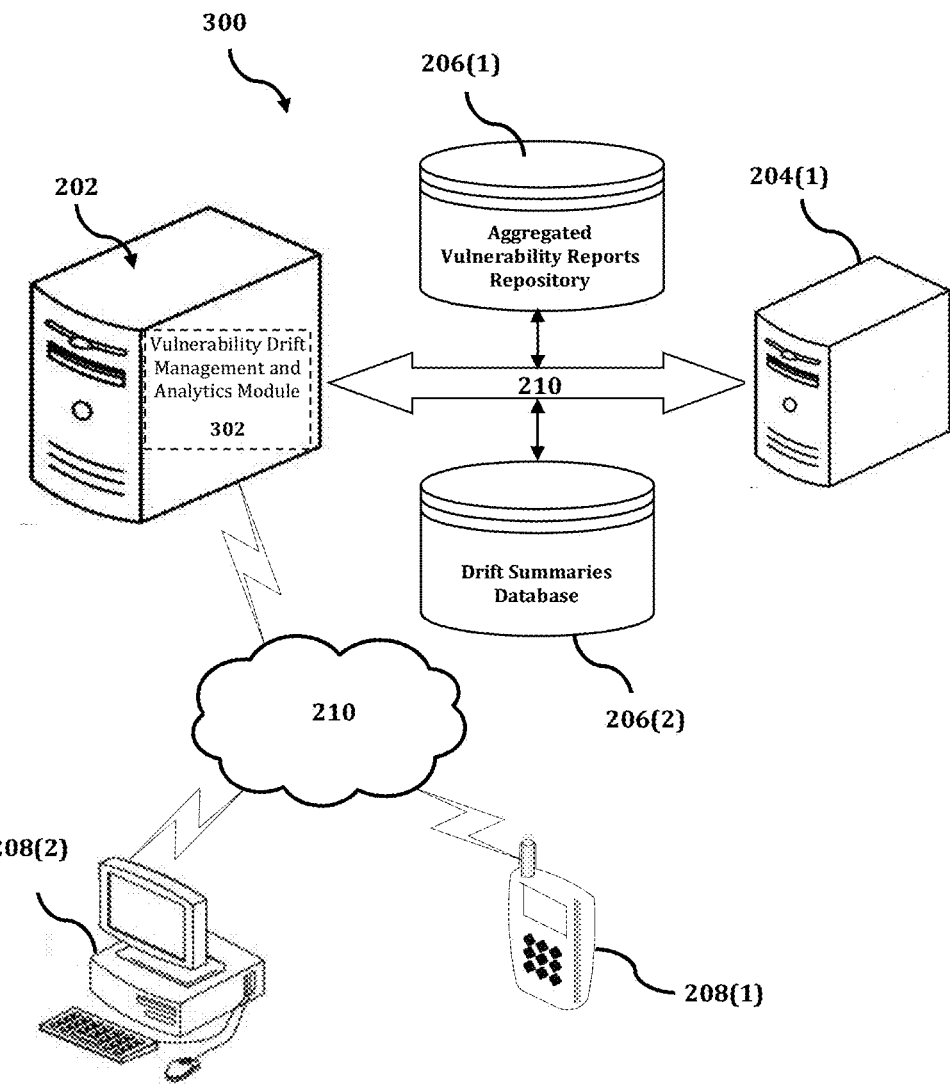
FIG. 3 shows an exemplary system for implementing a method for managing software programming vulnerabilities by using vulnerability drift analytics to prioritize, track, and visually represent identified vulnerabilities.

The VDMA device 202 is described and shown in FIG. 3 as including a vulnerability drift management and analytics module 302, although it may include other rules, policies, modules, databases, or applications, for example. As will be described below, the vulnerability drift management and analytics module 302 is configured to implement a method for managing software programming vulnerabilities by using vulnerability drift analytics to prioritize, track, and visually represent identified vulnerabilities.

An exemplary process 300 for implementing a mechanism for managing software programming vulnerabilities by using vulnerability drift analytics to prioritize, track, and visually represent identified vulnerabilities by utilizing the network environment of FIG. 2 is shown as being executed in FIG. 3. Specifically, a first client device 208(1) and a second client device 208(2) are illustrated as being in communication with VDMA device 202. In this regard, the first client device 208(1) and the second client device 208(2) may be "clients" of the VDMA device 202 and are described herein as such. Nevertheless, it is to be known and understood that the first client device 208(1) and/or the second client device 208(2) need not necessarily be "clients" of the VDMA device 202, or any entity described in association therewith herein. Any additional or alternative relationship may exist between either or both of the first client device 208(1) and the second client device 208(2) and the VDMA device 202, or no relationship may exist.

Further, VDMA device 202 is illustrated as being able to access an aggregated vulnerability reports repository 206(1) and a drift summaries database 206(2). The vulnerability drift management and analytics module 302 may be configured to access these databases for implementing a method for managing software programming vulnerabilities by using vulnerability drift analytics to prioritize, track, and visually represent identified vulnerabilities.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the VDMA device 202 via broadband or cellular communication. Of course, these embodiments are merely exemplary and are not limiting or exhaustive.

Upon being started, the vulnerability drift management and analytics module 302 executes a process for managing software programming vulnerabilities by using vulnerability drift analytics to prioritize, track, and visually represent identified vulnerabilities. An exemplary process for managing software programming vulnerabilities by using vulnerability drift analytics to prioritize, track, and visually represent identified vulnerabilities is generally indicated at flowchart 400 in FIG. 4.

In the process 400 of FIG. 4, at step S402, vulnerability reports that correspond to various applications may be aggregated. In an exemplary embodiment, each of the vulnerability reports may include information that relates to at least one from among a software bill of materials for all dependencies, an open-source license for each of a plurality of software components, and a list of security vulnerabilities that shows a severity level for each of the plurality of software components. A software scanner such as, for example, an open-source compliance scanner and a software composition analysis tool may be usable to provide the vulnerability reports. Consistent with present disclosures, the vulnerability reports may be generated by any one of a variety of code scans. The code scans may examine software codes and list all vulnerabilities for each of the software codes.

In another exemplary embodiment, the vulnerability reports may be aggregated based on a predetermined configuration. The predetermined configuration may include a predetermined schedule. For example, the vulnerability reports may be aggregated automatically from the software scanner on a daily basis. In another exemplary embodiment, the vulnerability reports may be aggregated in an ad hoc manner based on user preferences. For example, a user may interact with a graphical user interface to initiate the aggregation of the vulnerability reports.

In another exemplary embodiment, the various applications may include a program and/or a piece of software that is designed and written to fulfill a particular purpose of the user. Consistent with present disclosures, the applications may include application software, system software, and utility software. The applications may be coded as proprietary, open-source, or projects. The applications may be usable on various computing devices such as, for example, network servers as well as mobile devices.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

In another exemplary embodiment, an open-source Common Vulnerabilities and Exposures (CVE) lifecycle may include a first step that includes reporting of vulnerabilities by a CVE Numbering Authority (CNA). The reporting may be verified and listed in a United States National Vulnerability Database (NVD). In a second step, a patch and/or an updated software version may be issued by corresponding software authors. Then, in a third step, affected organizations that are currently implementing the software may patch and/or update corresponding applications in their enterprise networks.

In another exemplary embodiment, the software scanner may be built around an application development pipeline. That is, when an application is built in a development pipeline, the associated information may be captured by the software scanner and then checked against the CVE database. When data that correspond to the application goes from a testing phase to a release phase, the software scanner may generate the vulnerability reports. The vulnerability reports may provide detailed information as well as generate comparison data to show whether there is a vulnerability. When there is a vulnerability, the vulnerability may be called out based on a vulnerability scoring system.

In another exemplary embodiment, vulnerability reports may use a CVE database application programming interface (API) to access the vulnerability database, which may be updated every four hours. The vulnerability database may include detailed vulnerability information such as, for example, quantitative measures for severity. Consistent with present disclosures, data may be managed and pulled on a recurring basis to create time series data.

At step S404, the vulnerability reports may be appended to a historical record that corresponds to each of the applications. The historical record may include a plurality of previously collected vulnerability reports. In an exemplary embodiment, the historical record may correspond to a system-of-record for vulnerability reports of the applications. The historical record may enable comparisons of remediation abilities for each of the applications over time.

At step S406, metrics may be determined for each of the applications by using the corresponding historical record. The metrics may be usable to provide insight to facilitate a comparison of remediation abilities between various applications. The metrics may provide insight by quantitatively articulating the remediation abilities of each of the applications.

In an exemplary embodiment, to determine the metrics, the aggregated vulnerability reports may be parsed to identify vulnerability information. The vulnerability information may include data that corresponds to software vulnerabilities for each of the applications. Consistent with present disclosures, the software vulnerabilities may relate to a defect and/or a bug that is found in the code of a software library, a script, an application programming interface, and/or a similar software construct.

Then, vulnerabilities that correspond to each of the applications may be determined from the identified vulnerability information. The vulnerabilities may be determined by using an application identifier. For example, a vulnerability B that corresponds to application A may be determined by comparing the application identifier for application A with the application identifier that is associated with the vulnerability B. A match between the application identifier for application A and the application identifier for vulnerability B may indicate a corresponding relationship.

In another exemplary embodiment, determining the metrics for each of the applications may include determining a score metric for each of the vulnerabilities. The score metric may correspond to a mean score value that represents a principal characteristic of each of the vulnerabilities. The mean score value may include a severity factor. In another exemplary embodiment, the score metric may provide a way to capture the principal characteristics of a vulnerability and produce a numerical score that reflects a severity. The score metric may be usable as a proxy to deal with the difficulty in measuring applications that have a high number of low severity vulnerabilities with applications that have a small number of very severe vulnerabilities. The score metric may also be usable to predict a better performing application from two applications with a same number of vulnerabilities.

In another exemplary embodiment, determining the metrics for each of the applications may include determining a vulnerability count metric. The vulnerability count metric may relate to a total number of the vulnerabilities. In another exemplary embodiment, the vulnerability count metric may correspond to a baseline statistic that is usable as a ground-truth of the application. For example, a high vulnerability count is bad and a low count is good.

In another exemplary embodiment, determining the metrics for each of the applications may include determining an age metric for each of the vulnerabilities. The age metric may correspond to an amount of time between a first found time and a report time that is associated with the corresponding vulnerability report. The first found time may relate to a time value when each of the vulnerabilities is first discovered.

In another exemplary embodiment, when a vulnerability is found by the software scanner, the vulnerability may be tagged with a first found date and/or a first found time. The age metric may correspond to a length of time between the first found date and/or the first found time and a report date and/or a report time. Consistent with present disclosures, applications that remediate vulnerabilities immediately may be better performing than other applications that are slow to remediate the vulnerabilities. For example, a first application that has fewer vulnerabilities may be a bigger problem than a second, newer application with numerous vulnerabilities when the vulnerabilities of the first application have not been fixed in years.

In another exemplary embodiment, determining the metrics for each of the applications may include determining a vulnerability likelihood and severity metric for each of the vulnerabilities. The vulnerability likelihood and severity metric may correspond to a severity rating that is associated with a past due status for each of the vulnerabilities. The past due status may result from a determination that uses a service level agreement (SLA), a first found time, a calculated due data, and a determined point in time.

In another exemplary embodiment, the vulnerability likelihood and severity metric may be derived from data in the vulnerability reports. When the vulnerability likelihood and severity metric is identified, a corresponding SLA value may be calculated in terms of days based on predetermined standards and/or guidelines. Then, the SLA value may be added to the first found date and/or the first found time to calculate a due date. Using the vulnerability report date as a point in time, whether a found vulnerability is overdue may be determined within each predetermined category.

At step S408, drift summaries may be generated for each of the applications. The drift summaries may be generated based on the determined metrics and the corresponding historical record. In an exemplary embodiment, two vulnerability reports may be ingested into the disclosed data pipeline to facilitate generation of the drift summaries. The drift summaries may include the determined metrics. In another exemplary embodiment, the amount of time between the two vulnerability reports may be based on a predetermined parameter. The predetermined parameter may include a period of time. For example, two vulnerability reports that are a week apart may be usable to generate a corresponding drift summary.

At step S410, the drift summaries may be compared with previously generated corresponding drift summaries to identify changes. The changes may relate to a vulnerability status of a corresponding application. In an exemplary embodiment, the difference between at least two drift summaries may represent a delta, i.e., a change for the corresponding application, that relates to a vulnerability status. The changes may be determined for each of the applications within a line of business.

At step S412, drift reports may be generated for each of the applications. The drift reports may be generated based on the identified changes. In an exemplary embodiment, the drift reports may be generated based on a predetermined criterion such as, for example, a weekly time criterion. The main components of the drift summaries that are usable for the drift reports may include at least one from among a vulnerability count start component, a vulnerability count difference component, a vulnerabilities remaining component, a vulnerability age difference component, a vulnerability age remaining component, and a vulnerability likelihood and severity component.

The vulnerability count start component may relate to a number of vulnerabilities found for an application in a previous drift report. The vulnerability count difference component may relate to a difference of vulnerabilities found between the current drift report and a previous drift report. The vulnerabilities remaining component may relate to a number of vulnerabilities found for an application in the current drift report. The vulnerability age difference component may relate to a difference of vulnerability age between the current drift report and the previous drift report. The vulnerability age remaining component may relate to an age of vulnerabilities for an application in the current drift report. The likelihood and severity component may relate to a likelihood versus severity measure for a drift report.

In another exemplary embodiment, graphical representations for each of the generated drift reports may be generated. The graphical representations may include at least one from among a pictorial representation and a diagram that organizes information in the generated drift reports. In another exemplary embodiment, the graphical representations may include a dashboard that visually represents the information in the generated drift reports. The dashboard may relate to a reporting mechanism that aggregates and displays metrics and key indicators for examination by users.

In another exemplary embodiment, the graphical representations may include interactive graphical elements. The interactive graphical elements may be configured to receive inputs from users. The inputs may include instructions to alter the graphical representation based on user preferences. For example, a number of applications to display may be changed by using a text input box in the graphical representation. Similarly, the graphical representations may include sliders that enable users to change a range of data for visualizing. Then, the graphical representations may be displayed via an interactive web application. The graphical representations may be displayed via a graphical user interface of the interactive web application.

Figure 5:
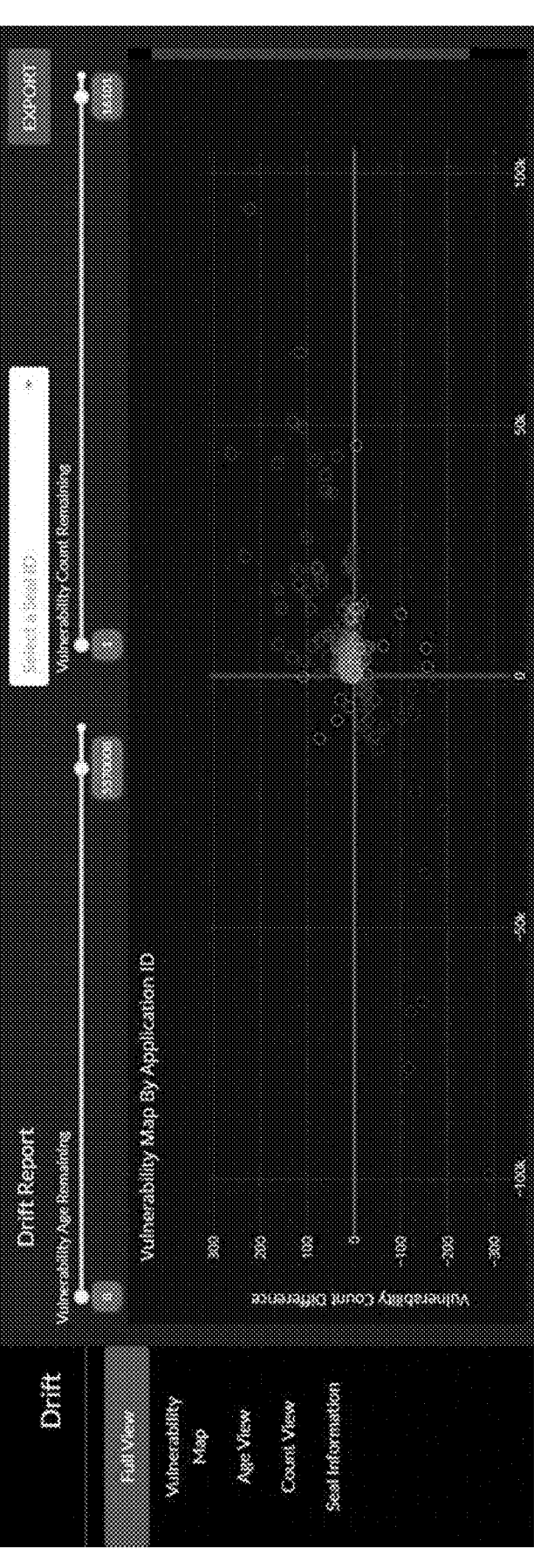
FIG. 5 is a screen shot that illustrates a graphical user interface that is usable for implementing a method for managing software programming vulnerabilities by using vulnerability drift analytics to prioritize, track, and visually represent identified vulnerabilities, according to an exemplary embodiment.

FIG. 5 is a screen shot 500 that illustrates a graphical user interface that is usable for implementing a method for managing software programming vulnerabilities by using vulnerability drift analytics to prioritize, track, and visually represent identified vulnerabilities, according to an exemplary embodiment. In FIG. 5, the drift reports may be visualized on an interactive, web-based application. The visualizations may include graphical representations such as, for example, dashboards that summarize the information by using graphical elements such as, for example, graphs. Additionally, the graphical elements may include input elements such as, for example, input boxes and graphical sliders that are configured to receive inputs from a user. The inputs may include instructions to alter the graphical representations based on user preferences.

As illustrated in FIG. 5, a vulnerability map may be generated to visualize data in the drift reports. The vulnerability map may plot each application that has vulnerabilities in a two-dimensional graph. The X-axis on the vulnerability map may show an age difference and the Y-axis may show a count difference. By plotting applications on the vulnerability map, a visual determination may be made to see which applications are moving towards a strictly worse application and which applications are moving towards a strictly better application. The quality of the applications may be visually represented by using colors such as, for example, green for better applications and red for worse applications.

In another exemplary embodiment, the graphical representations may include a graph that mimics application findings within a vulnerability likelihood and severity model. The graphical representations may be usable to show which vulnerabilities are overdue as well as corresponding expected resolution times. The graphical representations may use color ranges from red and orange as past due, to yellow as due now, to green and blue as due in the future. The color coded ranges may enable quick visual interpretation of data from the drift report.

Accordingly, with this technology, an optimized process for managing software programming vulnerabilities by using vulnerability drift analytics to prioritize, track, and visually represent identified vulnerabilities is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing vulnerability management by using drift analytics, the method being implemented by at least one processor, the method comprising:

retrieving, by the at least one processor via a compliance scanner and a software-composition analysis module, application data that corresponds to at least one application and is built into an application development pipeline;

comparing, by the at least one processor via the compliance scanner and the software-composition analysis module, the retrieved application data with data from a database;

aggregating, by the at least one processor via the compliance scanner and the software-composition analysis module, based on a result of the comparing, at least one vulnerability report that corresponds to the at least one application, wherein the aggregating is further based on a predetermined configuration, the predetermined configuration including a predetermined schedule;

appending, by the at least one processor, the at least one vulnerability report to a historical record that corresponds to the at least one application, the historical record including a plurality of previously collected vulnerability reports;

determining, by the at least one processor, at least one metric for each of the at least one application by using the corresponding historical record, wherein each respective at least one metric relates to a remediation ability of a corresponding application from the at least one application, wherein the determining of the at least one metric includes:

parsing the aggregated vulnerability reports to identify software vulnerabilities for each respective corresponding application from the at least one application by comparing each respective application identifier associated with each respective corresponding application with each respective vulnerability identifier associated with each respective corresponding vulnerability to determine matching; and quantitatively identifying remediation abilities based on a result of the matching;

generating, by the at least one processor, at least one drift summary for the at least one application based on the determined at least one metric and the corresponding historical record;

comparing, by the at least one processor, the at least one drift summary with at least one previously generated drift summary to identify at least one change, the at least one change relating to a vulnerability status;

generating, by the at least one processor, at least one drift report for the at least one application based on the identified at least one change; and implementing, by the at least one processor, a software patch, a remediation, or a software update to the at least one application, based on the generated at least one drift report, for addressing at least one vulnerability within the at least one vulnerability report.

2. The method of claim 1, further comprising:

generating, by the at least one processor, at least one graphical representation of the generated at least one drift report, the at least one graphical representation including at least one from among a pictorial representation and a diagram that organizes information in the generated at least one drift report; and displaying, by the at least one processor, the at least one graphical representation via an interactive web application.

3. The method of claim 2, wherein the at least one graphical representation includes at least one interactive graphical element that is configured to receive input from a user, the input including at least one instruction to alter the at least one graphical representation based on a user preference, wherein the at least one graphical representation further includes a vulnerability map that plots each application of the at least one application in a two-dimensional graph, wherein an X-axis of the graph represents an age difference, and wherein a Y-axis of the graph represents a count difference.

4. The method of claim 1, wherein each of the at least one vulnerability report includes information that relates to at least one from among a software bill of materials for all dependencies, an open-source license for each of a plurality of software components, and a list of security vulnerabilities that shows a severity level for each of the plurality of software components.

5. The method of claim 1, wherein the at least one application includes an event-driven, software-development architecture for detecting changes in a state of system hardware including the at least one processor.

6. The method of claim 5, further comprising:

determining, by the at least one processor, a score metric for each of the at least one vulnerability;

determining, by the at least one processor, a vulnerability count metric that relates to a total number of the at least one vulnerability;

determining, by the at least one processor, an age metric for each of the at least one vulnerability; and determining, by the at least one processor, a vulnerability likelihood and severity metric for each of the at least one vulnerability.

7. The method of claim 6, wherein the score metric corresponds to a mean score value that represents a principal characteristic of each of the at least one vulnerability, the mean score value including a severity factor.

8. The method of claim 6, wherein the age metric corresponds to an amount of time between a first found time and a report time that is associated with the at least one vulnerability report, the first found time relating to a time value when each of the at least one vulnerability is first discovered.

9. The method of claim 6, wherein the vulnerability likelihood and severity metric corresponds to a severity rating that is associated with a past due status for each of the at least one vulnerability, the past due status resulting from a determination that uses a service level agreement, a first found time, a calculated due date, and a determined point in time.

10. A computing device configured to implement an execution of a method for providing vulnerability management by using drift analytics, the computing device comprising:

a processor, a memory; and a communication interface coupled to each of the processor and the memory, wherein the processor is configured to:

retrieve, via a compliance scanner and a software-composition analysis module, application data that corresponds to at least one application and is built into an application development pipeline;

compare, via the compliance scanner and the software-composition analysis module, the retrieved application data with data from a database;

aggregate, via the compliance scanner and the software-composition analysis module, based on a result of the comparing, at least one vulnerability report that corresponds to the at least one application, wherein the aggregating is further based on a predetermined configuration, the predetermined configuration including a predetermined schedule;

append the at least one vulnerability report to a historical record that corresponds to the at least one application, the historical record including a plurality of previously collected vulnerability reports;

determine at least one metric for each of the at least one application by using the corresponding historical record, wherein each respective at least one metric relates to a remediation ability of a corresponding application from the at least one application, wherein the determining of the at least one metric includes:

parsing the aggregated vulnerability reports to identify software vulnerabilities for each respective corresponding application from the at least one application by comparing each respective application identifier associated with each respective corresponding application with each respective vulnerability identifier associated with each respective corresponding vulnerability to determine matching; and quantitatively identifying remediation abilities based on a result of the matching;

generate at least one drift summary for the at least one application based on the determined at least one metric and the corresponding historical record;

compare the at least one drift summary with at least one previously generated drift summary to identify at least one change, the at least one change relating to a vulnerability status;

generate at least one drift report for the at least one application based on the identified at least one change; and implement a software patch, a remediation, or a software update to the at least one application, based on the generated at least one drift report, for addressing at least one vulnerability within the at least one vulnerability report.

11. The computing device of claim 10, wherein the processor is further configured to:

generate at least one graphical representation of the generated at least one drift report, the at least one graphical representation including at least one from among a pictorial representation and a diagram that organizes information in the generated at least one drift report; and display the at least one graphical representation via an interactive web application.

12. The computing device of claim 11, wherein the at least one graphical representation includes at least one interactive graphical element that is configured to receive input from a user, the input including at least one instruction to alter the at least one graphical representation based on a user preference, wherein the at least one graphical representation further includes a vulnerability map that plots each application of the at least one application in a two-dimensional graph, wherein an X-axis of the graph represents an age difference, and wherein a Y-axis of the graph represents a count difference.

13. The computing device of claim 10, wherein each of the at least one vulnerability report includes information that relates to at least one from among a software bill of materials for all dependencies, an open-source license for each of a plurality of software components, and a list of security vulnerabilities that shows a severity level for each of the plurality of software components.

14. The computing device of claim 10, wherein the at least one application includes an event-driven, software-development architecture for detecting changes in a state of system hardware including the processor.

15. The computing device of claim 14, wherein the processor is further configured to:

determine a score metric for each of the at least one vulnerability;

determine a vulnerability count metric that relates to a total number of the at least one vulnerability;

determine an age metric for each of the at least one vulnerability; and determine a vulnerability likelihood and severity metric for each of the at least one vulnerability.

16. The computing device of claim 15, wherein the score metric corresponds to a mean score value that represents a principal characteristic of each of the at least one vulnerability, the mean score value including a severity factor.

17. The computing device of claim 15, wherein the age metric corresponds to an amount of time between a first found time and a report time that is associated with the at least one vulnerability report, the first found time relating to a time value when each of the at least one vulnerability is first discovered.

18. The computing device of claim 15, wherein the vulnerability likelihood and severity metric corresponds to a severity rating that is associated with a past due status for each of the at least one vulnerability, the past due status resulting from a determination that uses a service level agreement, a first found time, a calculated due date, and a determined point in time.

19. A non-transitory computer readable storage medium storing instructions for providing vulnerability management by using drift analytics, the storage medium comprising executable code which, when executed by a processor, causes the processor to:

retrieve, via a compliance scanner and a software-composition analysis module, application data that corresponds to at least one application and is built into an application development pipeline;

compare, via the compliance scanner and the software-composition analysis module, the retrieved application data with data from a database;

aggregate, via the compliance scanner and the software-composition analysis module, based on a result of the comparing, at least one vulnerability report that corresponds to the at least one application, wherein the aggregating is further based on a predetermined configuration, the predetermined configuration including a predetermined schedule;

append the at least one vulnerability report to a historical record that corresponds to the at least one application, the historical record including a plurality of previously collected vulnerability reports;

determine at least one metric for each of the at least one application by using the corresponding historical record, wherein each respective at least one metric relates to a remediation ability of a corresponding application from the at least one application, wherein the determining of the at least one metric includes:

parsing the aggregated vulnerability reports to identify software vulnerabilities for each respective corresponding application from the at least one application by comparing each respective application identifier associated with each respective corresponding application with each respective vulnerability identifier associated with each respective corresponding vulnerability to determine matching; and quantitatively identifying remediation abilities based on a result of the matching;

generate at least one drift summary for the at least one application based on the determined at least one metric and the corresponding historical record;

compare the at least one drift summary with at least one previously generated drift summary to identify at least one change, the at least one change relating to a vulnerability status;

generate at least one drift report for the at least one application based on the identified at least one change; and implement a software patch, a remediation, or a software update to the at least one application, based on the generated at least one drift report, for addressing at least one vulnerability within the at least one vulnerability report.

20. The storage medium of claim 19, wherein, when executed by the processor, the executable code further causes the processor to:

generate at least one graphical representation of the generated at least one drift report, the at least one graphical representation including at least one from among a pictorial representation and a diagram that organizes information in the generated at least one drift report; and display the at least one graphical representation via an interactive web application.

\* \* \* \* \*